(12) United States Patent
Fricker et al.

(10) Patent No.: US 11,278,835 B2
(45) Date of Patent: Mar. 22, 2022

(54) CONTINUOUSLY REGENERABLE MEDIA PURIFIER

(71) Applicant: Oceaneering International, Inc., Houston, TX (US)

(72) Inventors: John Fricker, Taylor Lake Village, TX (US); Tatsuya Arai, League City, TX (US)

(73) Assignee: Oceaneering International, Inc., Houston, TX (US)

( * ) Notice: Subject to any disclaimer, the term of this patent is extended or adjusted under 35 U.S.C. 154(b) by 417 days.

(21) Appl. No.: 15/962,853

(22) Filed: Apr. 25, 2018

(65) Prior Publication Data
US 2019/0015767 A1 Jan. 17, 2019

Related U.S. Application Data

(60) Provisional application No. 62/489,889, filed on Apr. 25, 2017.

(51) Int. Cl.
*B01D 46/00* (2006.01)
*B01D 53/06* (2006.01)
*B01D 53/62* (2006.01)

(52) U.S. Cl.
CPC ....... *B01D 46/0067* (2013.01); *B01D 46/002* (2013.01); *B01D 46/0036* (2013.01);
(Continued)

(58) Field of Classification Search
CPC ............... B01D 46/0067; B01D 53/06; B01D 2201/16; B01D 2257/504;
(Continued)

(56) References Cited

U.S. PATENT DOCUMENTS 4,409,006 A * 10/1983 Mattia .................... B01D 53/06
                                                                    95/113
5,464,468 A * 11/1995 Tanaka ................... B01D 53/06
                                                                    96/125
(Continued)

FOREIGN PATENT DOCUMENTS

WO    WO-2015119736 A1 *   8/2015   .............. F16C 33/80

OTHER PUBLICATIONS

"Diamond coated silicon carbide faces" Flowserve published Mar. 2014 accessed at <https://www.flowserve.com/sites/default/files/2017-11/FSD256eng-e.pdf> (Year: 2014).*

(Continued)

*Primary Examiner* — Stephen Hobson
(74) *Attorney, Agent, or Firm* — Maze IP Law, P.C.

(57) ABSTRACT

Regeneration of a fluid medium can be accomplished using a continuously regenerable scrubber, which, in its various embodiments, combines valve functions and sorbent material, such as amine beds, into one component, dramatically reducing size and mass of scrubber. Sorbent material beds rotate continuously past breathing gas vent loop ports for scrubbing $CO_2/H_2O$ and then past vacuum ports for regenerating the sorbent material. Typically, a first fluid output is connected to a lower header fluid output and a second, sweeping fluid source connected to a lower header fluid input. A motor spins the substantially circular bed assembly at a predetermined speed which allows adsorption or absorption as well as desorption of materials flowing through the sorbent material.

13 Claims, 9 Drawing Sheets

(52) U.S. Cl.
CPC ......... *B01D 46/0056* (2013.01); *B01D 53/06* (2013.01); *B01D 53/62* (2013.01); *B01D 2201/082* (2013.01); *B01D 2201/16* (2013.01); *B01D 2252/204* (2013.01); *B01D 2253/20* (2013.01); *B01D 2257/504* (2013.01); *B01D 2257/80* (2013.01); *B01D 2258/06* (2013.01); *B01D 2259/40086* (2013.01); *B01D 2259/4541* (2013.01); *B01D 2259/4566* (2013.01)

(58) Field of Classification Search
CPC .... B01D 2259/40086; B01D 2252/204; B01D 2201/082; B01D 53/62; B01D 46/002; B01D 46/0036; B01D 46/0056
See application file for complete search history.

(56) References Cited

U.S. PATENT DOCUMENTS

| | | | | |
|---|---|---|---|---|
| 2012/0152116 | A1* | 6/2012 | Barclay | C07C 7/12 95/113 |
| 2013/0152789 | A1* | 6/2013 | Polshettiwar | B01J 20/3085 95/139 |
| 2014/0134553 | A1* | 5/2014 | Ghoniem | F23C 99/00 431/170 |
| 2015/0053087 | A1* | 2/2015 | Postgate | F16J 15/022 96/144 |
| 2015/0298050 | A1* | 10/2015 | Richardson | A23L 3/34095 96/144 |
| 2017/0165602 | A1* | 6/2017 | Postage | F16J 15/3416 |

OTHER PUBLICATIONS

"Ceramic Paper Gaskets" Keith Payne Products published Apr. 2, 2016 accessed at <https://web.archive.org/web/20160402043530/https://www.keithpayneproducts.com/gasket-manufacturers/ceramic-paper-gaskets/> (Year: 2016).*

Nowicki's "The basics of activated carbon adsorption" published Feb. 1, 2016 accessed at <https://www.watertechonline.com/wastewater/article/15549902/the-basics-of-activated-carbon-adsorption> (Year: 2016).*

* cited by examiner

CONTINUOUSLY REGENERABLE MEDIA PURIFIER

RELATION TO OTHER APPLICATIONS

This application claims priority through U.S. Provisional Application 62/489,889, filed Apr. 25, 2017.

BACKGROUND

Certain environments require a device, typically called a scrubber, which removes $CO_2$ and water vapor from a ventilation loop such as in a spacesuit or spacecraft. However, these scrubbers typically are cyclical and use the like of pressure swing beds that shift beds, then wait for some time, then shift again.

In addition, thermal integration of adsorption and desorption beds are often required for optimum performance.

FIGURES

Various figures are included herein which illustrate aspects of embodiments of the disclosed inventions.

DESCRIPTION OF EXEMPLARY EMBODIMENTS

As described below, the various embodiments combine valve and sorbent material, such as amine beds, into one component, dramatically reducing size and mass of scrubber. In embodiments, the continuously regenerable scrubber may also use diamond coated ceramic face seals (flat on flat seal) such as used in pumps (no O-rings or gaskets) for reduced friction, long life, and contaminant insensitivity. The sorbent material beds rotate continuously past breathing gas vent loop ports for scrubbing $CO_2/H_2O$ and then past vacuum ports for regenerating the sorbent material.

Figure 1:
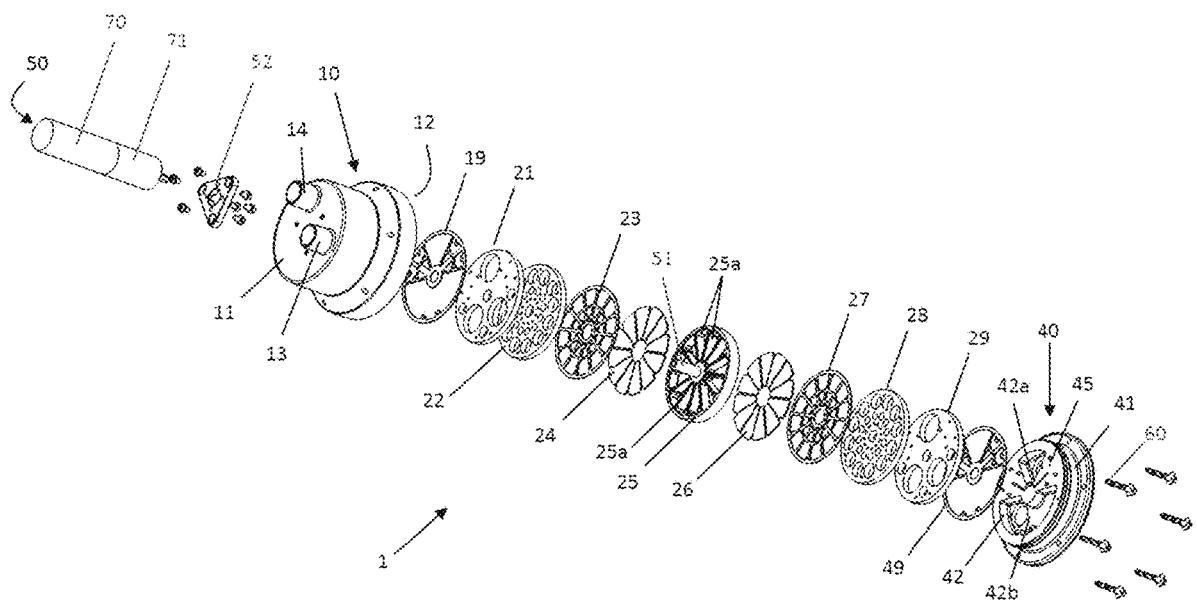
FIG. 1 is an exploded view in partial perspective of an exemplary continuously regenerable scrubber.
Figure 2:
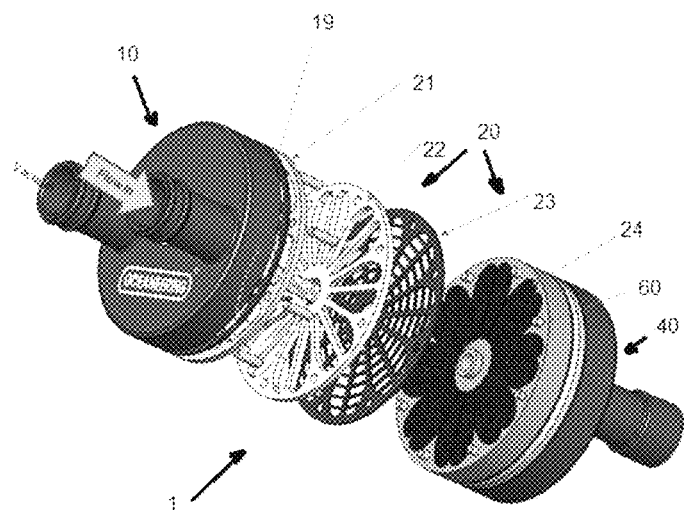
FIG. 2 is a further exploded in partial perspective of an exemplary continuously regenerable scrubber.

Referring generally to FIGS. 1 and 2, in a first embodiment continuously regenerable scrubber 1 comprises upper header 10, upper header spacer 21, lower header 40, lower header spacer 29, rotatable bed assembly 20 disposed intermediate the upper header and the lower header, and one or more fasteners 60 adapted to fasten upper header 10 to lower header 40.

Upper header 10 typically comprises outer surface 11, inner surface 12, upper header fluid inlet 13 disposed through outer surface 11 and providing a fluid pathway to and through inner surface 12, upper header pressure inlet 14 disposed through outer surface 11 to and through inner surface 12, and upper header gasket 19 typically disposed intermediate outer surface 11 and upper header spacer 21.

Upper header spacer 21 is typically disposed about a lower surface of upper header 10, typically disposed after outer surface 11.

Lower header 40 is connected to upper header 10 and typically comprises outer surface 41, inner surface 42, one or more partitioning walls 45 disposed within inner surface 42, lower header fluid outlet 43 disposed through outer surface 41 to and through inner surface 42; lower header pressure outlet 44 disposed through outer surface 41 to and through inner surface 42; and lower header gasket 49 typically disposed intermediate outer surface 41 and upper header spacer 29. Each partitioning wall 45 typically defines one or more desorption areas, e.g. 42a, and one or more separate adsorption areas, e.g. 42b. Lower header spacer 29 is typically disposed about outer surface 41 of the lower header 40.

Rotatable bed assembly 20, which is typically disposed intermediate upper header 10 and lower header 40, typically comprises one or more material containers 25, bottom gasket 27 disposed proximate a lower surface of material container 25, bottom bed screen 26 disposed intermediate bottom gasket 27 and the lower surface of material container 25; bottom disk 28 connected to bottom bed screen 26 where lower space 29 is further disposed intermediate bottom disk 28 and lower header 40; upper gasket 23 disposed proximate an upper surface of material container 25; upper bed screen 24 disposed intermediate upper gasket 23 and the upper surface of material container 25; upper disk 22 connected to the upper bed surface; and header spacer 22 disposed intermediate upper header 10 and upper gasket 23. As used herein, "upper" means towards upper header 10 and "lower" means towards lower header 40.

Rotator 51 is typically present and disposed through upper header 10 and/or lower header 40 and cooperatively mates with rotatable bed assembly 20 to effect turning of rotatable bed assembly 20, such as via motor 70 (not shown in the figures). One or more washers 52 may be present as well, such that rotator 51 is disposed through such washers 52.

In addition, skirt 65 may be disposed about an outer surface of the rotatable bed assembly 20.

Upper header spacer 21 and lower header spacer 29 typically comprise a ceramic. In embodiments, header spacer 22 and/or bottom disk 28 comprise a diamond coating.

In embodiments, upper header gasket 19 comprises a plurality of openings and upper header spacer 21 comprises a corresponding plurality of openings. Further, in embodiments lower header gasket 49 also comprises a plurality of openings and lower header spacer 29 comprises a plurality of openings corresponding to the openings in lower header gasket 49. These openings in upper header gasket 19 and upper header spacer 21 do not necessarily have to be the same in number or shape as the openings in lower header gasket 49 and lower header spacer 29, respectively.

Material container 25 comprises a shape that is rotatable within upper header 10 and lower header 40 and further comprises one or more material receivers 25a therethrough, each with a predetermined sorbent material 100 (FIG. 4A) disposed therein. Bottom bed screen 26 and upper bed screen 24 each typically comprises a shape sufficient to conform to the plurality of material receivers 25a. In these embodiments, bottom gasket 27 comprises a plurality of openings.

In addition, bottom disk 28 comprises a plurality of openings as does upper gasket 23. Moreover, upper disk 22 and header spacer 22 may also comprise a plurality of openings.

Fastener 60 may comprise a plurality of bolts, e.g. bolts disposed through eyelet lugs disposed towards an outer diameter of upper header 10 and lower headers 40. Belleville or wave springs under the bolt heads can provide consistent seal compression and compensation for temperature extremes.

Figure 3A:
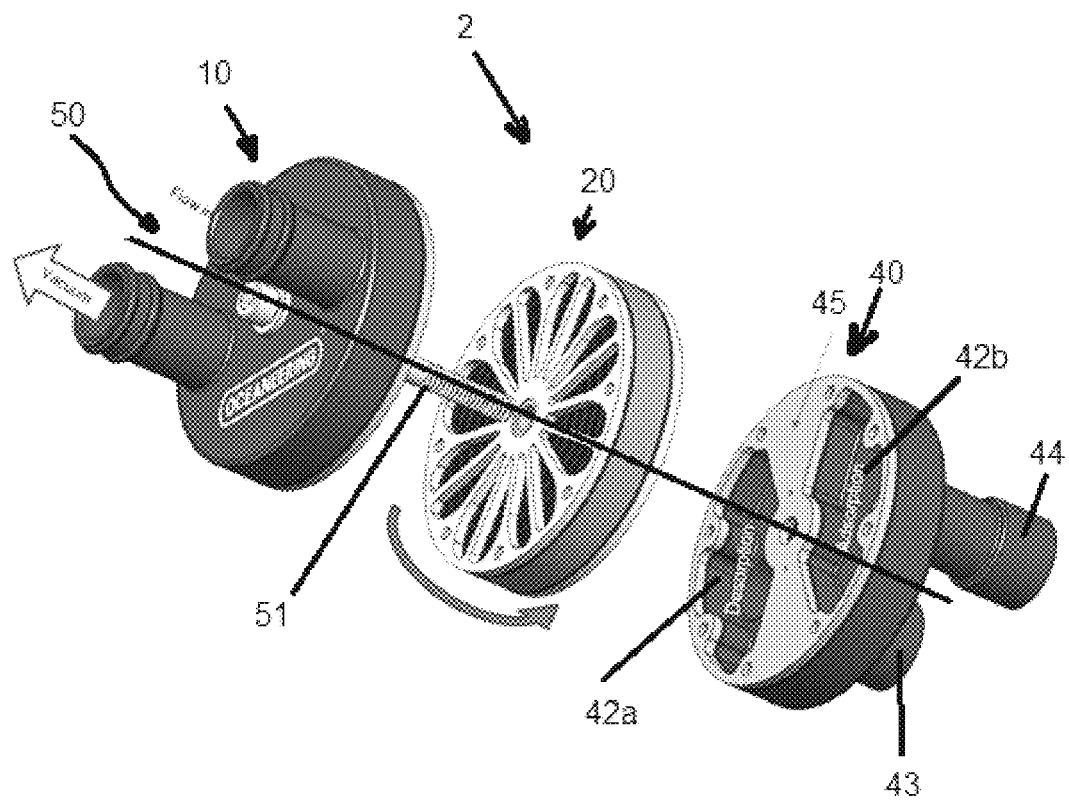
FIG. 3A is a further exploded in partial perspective of an exemplary continuously regenerable scrubber and FIG. 3B comprises an exploded view in partial perspective of an exemplary continuously regenerable scrubber and a view in partial perspective of an exemplary continuously regenerable scrubber assembly.

Referring additionally to FIG. 3A, header central axis 50 is defined by an axis extending through a center of upper header 10 to a center of lower header 40.

Figure 3B:
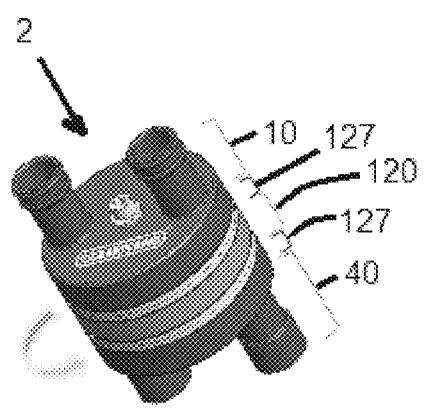

Referring now to FIG. 3B, in a second embodiment, continuously regenerable media purifier 2 comprises upper header 10, lower header 40, and substantially circular bed assembly 120 disposed intermediate upper header 10 and lower header 40.

Figure 4A:
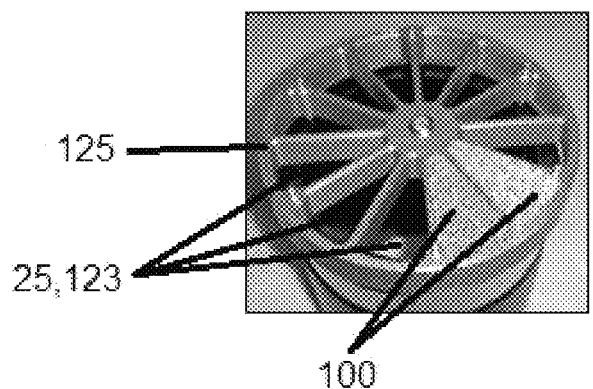
FIGS. 4A-4E are views in partial perspective of an exemplary rotatable bed assembly and/or of an exemplary substantially circular bed assembly which is similar to a rotatable bed assembly from its lower side.
Figure 4B:
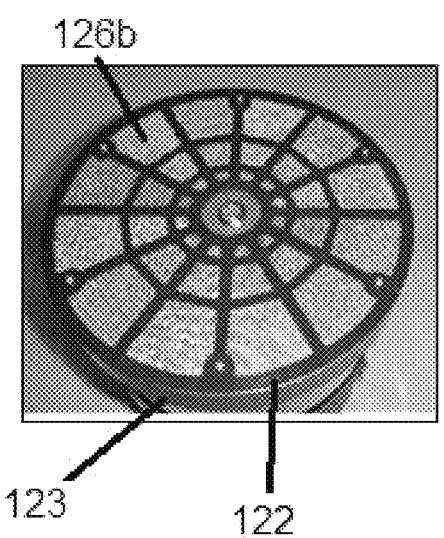
Figure 4C:
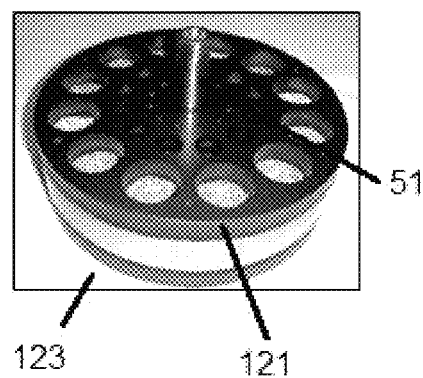
Figure 4D:
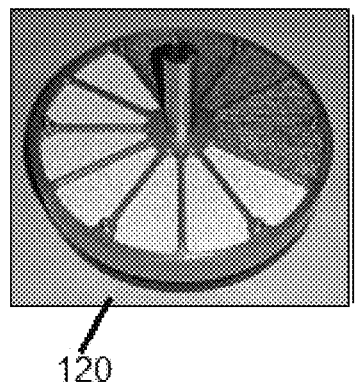
Figure 4E:
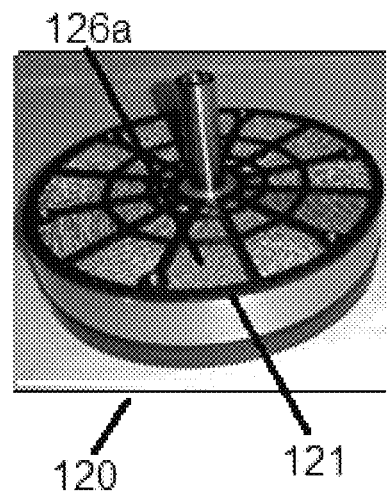
Figure 5A:
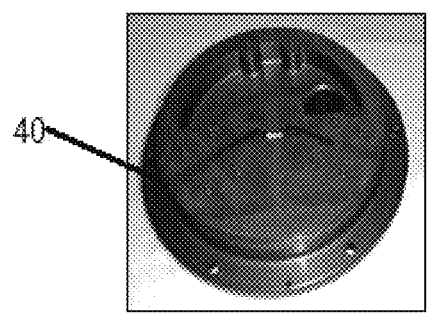
FIG. 5A-5E are views in partial perspective of an exemplary upper header.
Figure 5B:
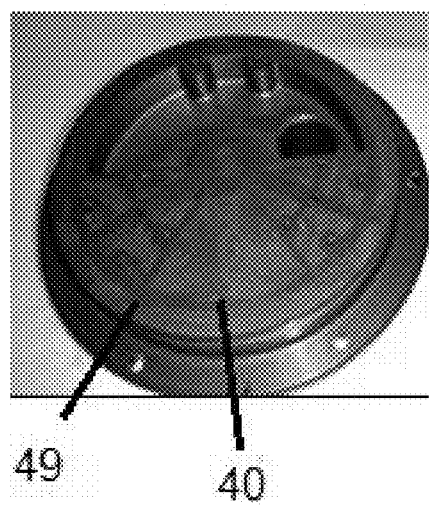
Figure 5C:
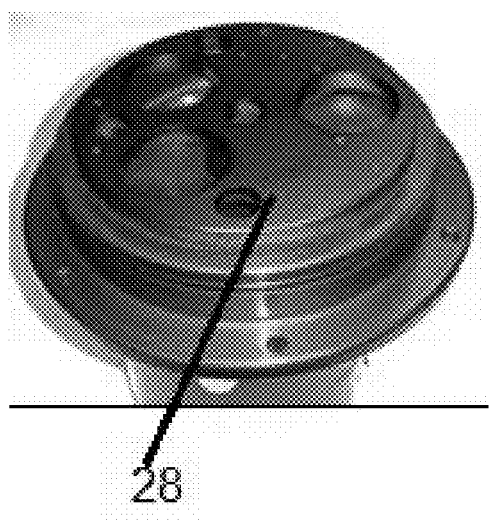
Figure 5D:
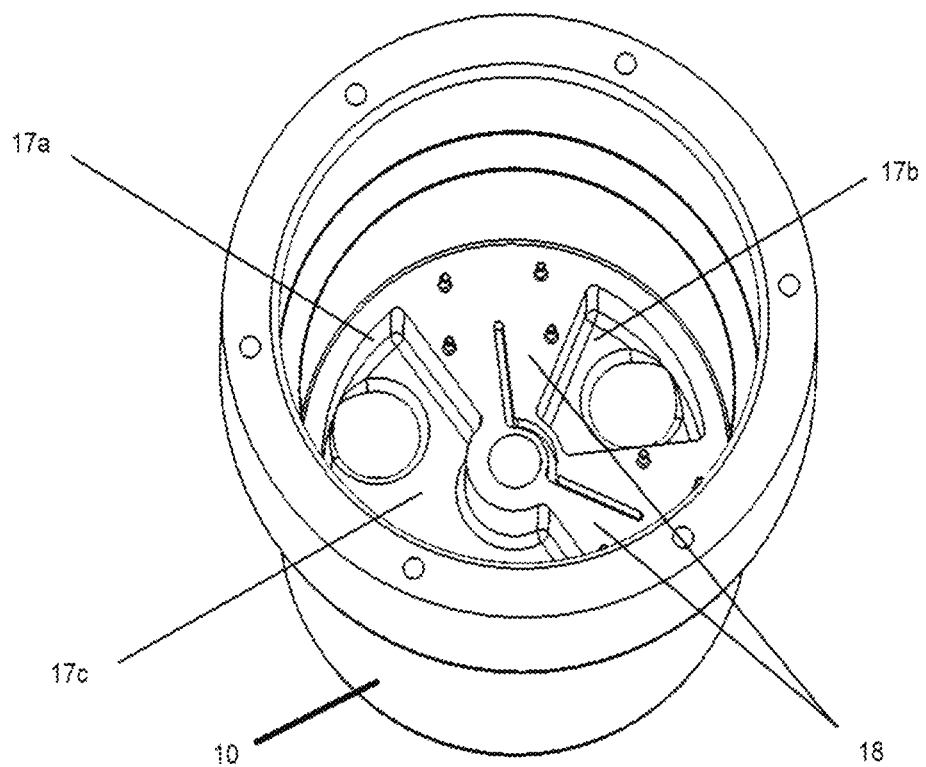
Figure 5E:
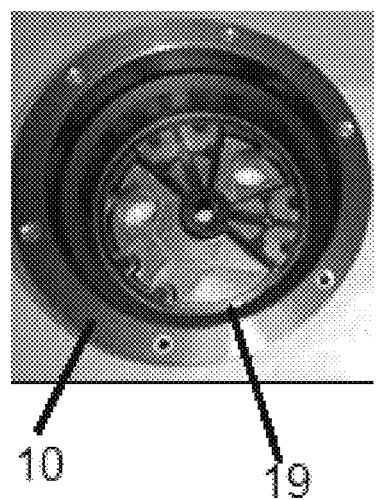

Referring additional to FIGS. 4A-4B, substantially circular bed assembly 120, which is similar to rotatable bed assembly 20, typically comprises substantially circular upper disc 121 which comprises a plurality of upper surface voids and substantially circular lower disc 122 which also comprises a plurality of lower surface voids. Each of substantially circular lower disc 122 and substantially circular upper disc 121 typically has the same circumference as substantially circular bed assembly 120. Substantially circular bed assembly 120 further typically comprises substantially circular material container 123 which has the same circumference as substantially circular upper disc 121 and substantially circular lower disc 122 and which is disposed intermediate substantially circular upper disc 121 and substantially circular lower disc 122. Substantially circular material container 123 is connected to substantially circular upper disc 121 at an upper side of substantially circular material container 123 and to substantially circular lower disc 122 at a lower side of substantially circular material container 123.

Substantially circular lower surface material container 123 typically comprises one or more interior voids 125. A disc central axis is defined by axis 50 (FIG. 1) extending through a center of upper disc 121, a center of lower disc 122, and a center of substantially circular bed assembly 120, where the disc central axis is substantially coaxial with respect to axis 50. The plurality of the upper surface voids and the plurality of the lower surface voids extend axially from a point proximate axis 50 to a point proximate an outer boundary of substantially circular bed assembly 120.

Substantially circular bed assembly 120 further typically comprises sorbent material 100 disposed in one or more of the substantially circular bed assembly interior voids where first constraining filtering member 126a is disposed intermediate upper disc 121 and the interior voids and second constraining filtering member 126b is disposed intermediate lower disc 122 and the interior voids.

Referring back to FIG. 3A, in each configuration, upper header 10 typically comprises fluid input port 13 and fluid output port 14 and lower header 40 typically comprise fluid input port 43, which is fluidly isolated from upper header fluid input 13 and upper header fluid output 14, and fluid output port 44, which is fluidly isolated from upper header fluid input 13 and upper header fluid output 14. However, in embodiments, only fluid output port 44, which is fluidly isolated from upper header fluid input 13 and upper header fluid output 14, may be present.

In any of these embodiments, substantially circular upper disc 21,121 typically comprises a smooth surface in communication with upper header 10 and, similarly, substantially circular lower disc 122 typically comprises a smooth surface in communication with lower header 40. Further, substantially circular material container 25,123 is typically connected to substantially circular upper disc 121 at the upper side of substantially circular material container 25,123 and to substantially circular lower disc 122 at a lower side of substantially circular material container 25,123. This connection typically uses one or more fasteners 60 to connect substantially circular upper disc 121 to substantially circular lower disc 122.

Referring additionally to FIG. 3A, in certain alternative embodiments, one or more seals (such as 23, 27, and 127) may be present and disposed intermediate substantially circular upper disc 121 and upper header 10 as well as one or more seals 127 disposed intermediate substantially circular lower disc 122 and lower header 40.

Referring now to FIGS. 5A-5E, in alternative embodiments, upper header 10 further comprises upper header interior void 17b, 17c and upper header interior wall 17a disposed within upper header interior void 17, where upper header interior wall 17a defines a plurality of upper header fluid chambers. In these embodiments, lower header 40 further typically comprises one or more lower header interior voids such defined by desorption areas 42a and adsorption areas 42b, and lower header interior wall disposed 45 within the lower header interior void where lower header interior wall 42 defines a plurality of lower header fluid chambers defined by desorption areas 42a and adsorption areas 42b. These walls and voids may be contiguous. In certain of these alternative embodiments, the plurality of upper header fluid chambers further comprises at least two upper header fluid chambers separated by a fluid blocking portion 18 and the plurality of lower header fluid chambers further comprises two or more lower header fluid chambers separated by fluid blocking portion 45.

Figure 6:
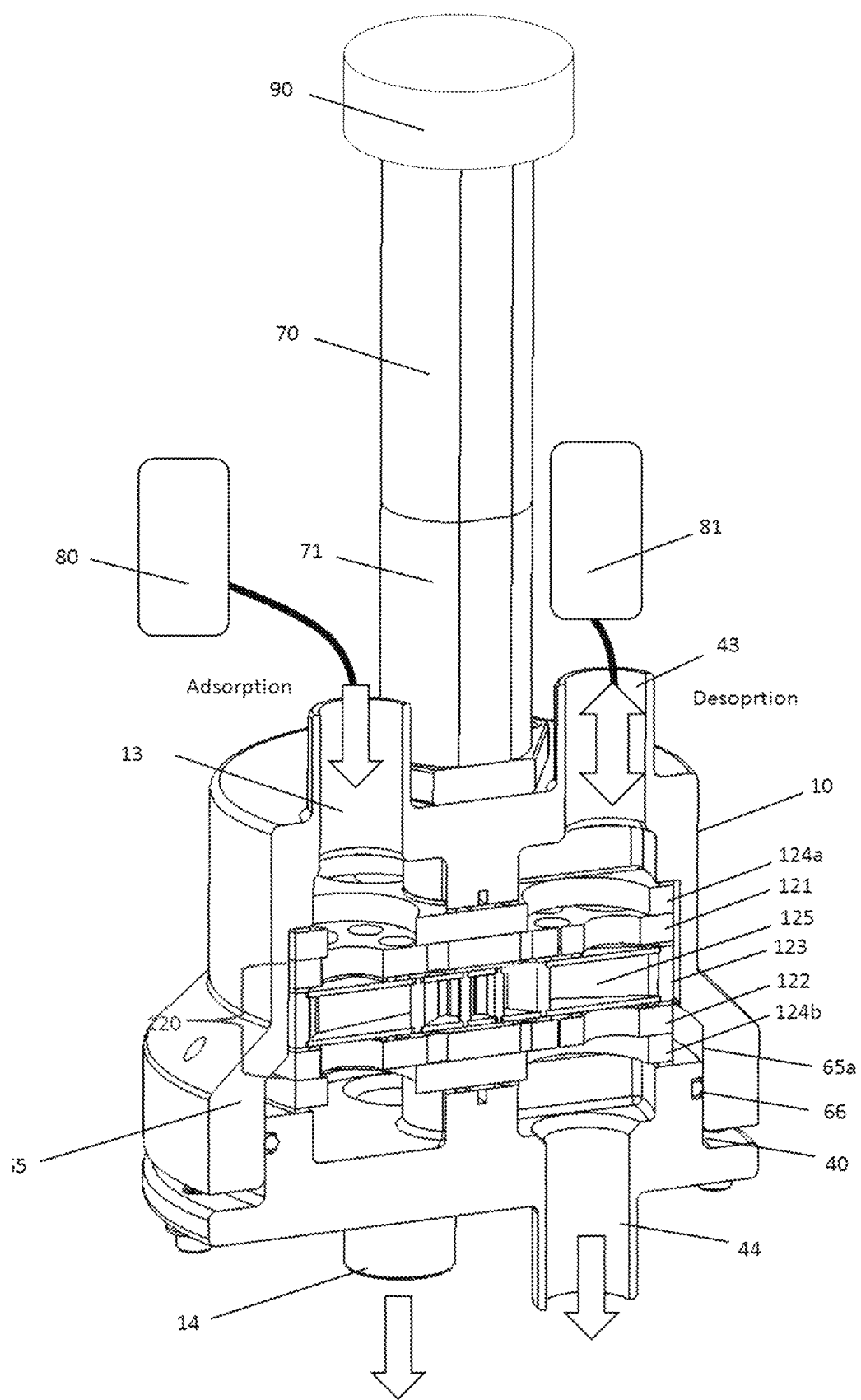
FIG. 6 is a schematic view of an exemplary system.
Figure 7A:
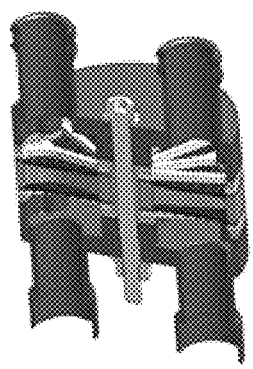
FIGS. 7 and 7A are schematic views, one in partial perspective, of an assembled exemplary continuously regenerable scrubber.
Figure 7:
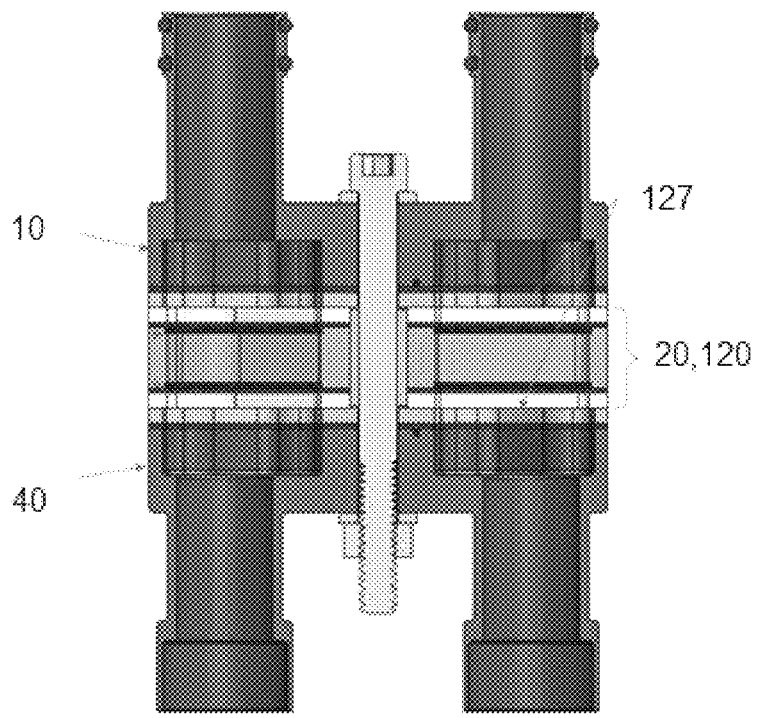
Figure 8:
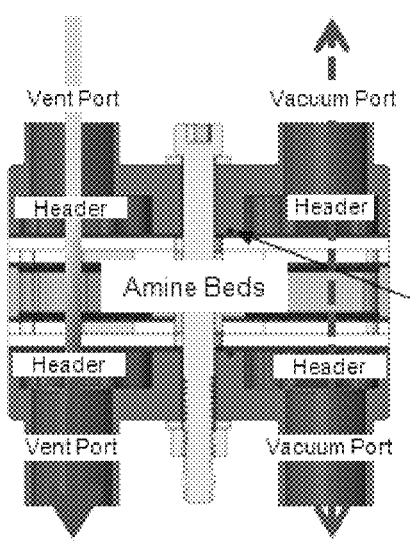
FIG. 8 is a schematic cutaway view in illustrating fluid flows.
Figure 9:
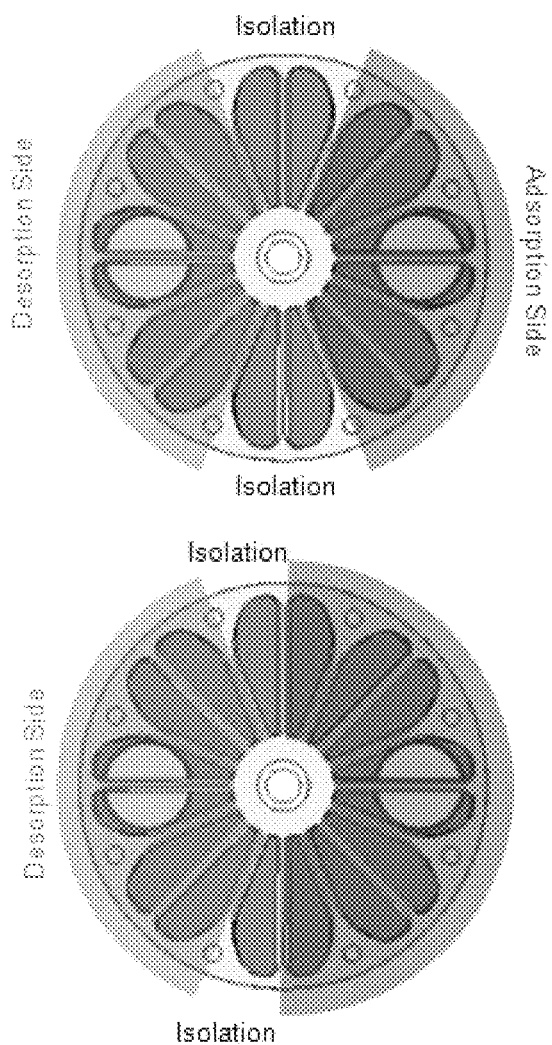
FIG. 9 are top down schematic views in illustrating adsorption, desorption, and isolation fluid flows.

Referring now to FIG. 6, in embodiments, skirt 65 may be present, comprising an exterior surface, a substantially arcuate interior 65a whose geometry is congruent with an outer boundary of substantially circular bed assembly 120, and one or more seals 66 adapted to isolate substantially circular bed assembly 120 from the exterior surface of skirt 65. Seals 66 may comprises an O-ring disposed intermediate skirt 65 and upper header 10 to allow skirt 65 to slide axially along the header central axis while maintaining the enclosure.

Fastener 60, which may comprise a thread or a clamp, may be present as well and adapted to fix seals 66 on upper header 10 and/or lower header 40.

Referring still to FIG. 6, disc rotation system 200 comprises a continuously regenerable media purifier in any of the above embodiments as described above; a shaft such as rotator 51 which is operatively connected to rotatable bed assembly 20 (or substantially circular bed assembly 120); motor 70 operatively in communication with the shaft; one or more gears 71 operatively in communication with motor 70; one or more sensors 72 (not shown in the figures) operatively in communication with the shaft; one or more first fluid sources 80 in fluid communication with fluid input port 13; one or more second fluid sources 81, which can provide a vacuum, in fluid communication with fluid ports 43,44; and control system 90 operatively in communication with sensors 72 and motor 70, where control system 90 is operative to control the rotation speed of motor 70. In typical embodiments, the rotation speed comprises a fixed rotation speed, a manually changeable rotation speed, a feedback/feedforward-controlled rotation speed, or the like, or a combination thereof.

In any of these embodiments, upper header fluid input port 13 and lower header fluid input port 43 may be adapted for use with an input fluid and upper header fluid output port 14 and lower header fluid output port 44 may be adapted for use with an output fluid comprising a lower pressure than a pressure of the input fluid, where the output fluid functions as a sweeping fluid.

In any of these embodiments, sorbent material 100 (FIG. 4A) typically comprises amine, and typically comprises beads having a diameter of around 0.36 mm to get a greater surface area/mass than an average bead diameter of 0.48 mm. Selecting for small beads by filtering may increase adsorption significantly because smaller beads have more surface area/mass.

In any of these embodiments, the plurality of upper surface voids and the plurality of lower surface voids may comprise one or more circular or fan-shaped holes and substantially circular material container 25,123 may comprise one or more walls disposed intermediate the plurality of holes. These holes and wall may define an angled, twisted, or torturous path.

In addition, cutouts on material container 25 may have one or more shoulders to place filtering materials. Material container 25 may comprise a tapered shape and rotary interfacing members such as upper disk 22 and bottom disk 28 may comprise the same or different sizes.

In the operation of exemplary embodiments, referring generally to FIGS. 1, 3A, and 6, the embodiments of a continuously regenerable media purifier 1,2 may operate dry, i.e. without lubrication, and operate with a continuous rotational motion, combining valve and bed functions into one component. Typically, beds of sorbent material as used in this invention do not require thermal integration of adsorption and desorption beds because exposure of materials such amine to adsorption and desorption beds switches back and forth faster than material can change temperature.

Fluid may be continuously scrubbed and regenerating using any of the embodiments above by connecting first fluid source 80 to upper header fluid input 13 which is selectively fluidly in communication with lower header fluid output 43 and by connecting upper header pressure inlet 14, which is selectively in fluid communication with lower header pressure inlet 44, to second fluid source 81, typically comprising and/or supplying a fluid under positive or negative pressure such as a vacuum source or other source of sweeping fluid.

Motor 70 is energized to spin rotatable bed assembly 20 (or substantially circular bed assembly 120) at a predetermined speed which allows absorption or adsorption of materials in the fluids flowing through sorbent material 100 present such as in material receivers 25a and to also allow desorption of materials flowing through sorbent material 100. A relatively infinitely tunable $CO_2$ output allows power to be minimized and controlling the speed of rotating bed 20 (or substantially circular bed assembly 120) changes the amount of $CO_2$ coming out of continuously regenerable scrubber 1,2. Speed can be minimized so $CO_2$ output level is always at the required level and not better than required. Minimum speed equals minimum power. Faster RPM may be used to shorten adsorption and desorption time.

It has been found that around a 3 millisecond residence time of vent gas flowing through the sorbent material was sufficient to scrub $CO_2$. Testing has also shown that continuously regenerable scrubber 1,2 can get an effective ceramic seal with low leakage and low torque.

Isolation area between adsorption and desorption sides may be decreased to get more available bead volume. Adsorption to desorption cell ratio may also be changed since desorption happens quickly, giving a lower pressure differential for an adsorption side, but a ratio is assumed to be 1:1. If a 4:3 ratio is used, and an isolation area reduced, flow can be reduced and pressure dropped through each material container 25, e.g. by 25%, and the mass of amine beads goes up, e.g. 33%. Desorption time and adsorption time are variable and optimizable by varying the geometry of single or plural of desorption chamber 42a and adsorption chamber 42b.

An air save feature may be used to save a portion the fluid in material containers 25 by sending it to a regenerated and evacuated material container 25 that is about to enter a vent stream, set to occur as material container 25 rotates. In addition, skirt 65, if present, is typically disposed over an outside of ceramic seal 65a which is pressurized to nearly match the pressure inside seal 125, thereby nearly eliminating the pressure driving force that causes leakage and pressure driven torque to rotate the bed 120.

Moreover, use of one or more pressure balanced seals 127, which may be ceramic seals, helps to reduce leakage. This can include skirt 65 disposed over an outside of seal 127 which is pressurized to nearly match the pressure inside seal 125, thereby nearly eliminating the pressure driving force that causes leakage. Further, use of a pressure balanced bed such as material container 25 may also reduce required seal squeeze, which, in turn, reduces friction, which, in turn, helps reduce the size, weight, and power of motor 70 required to spin rotatable bed assembly 20.

As is discussed above, in its various embodiments continuously regenerable media purifier 1,2 may be enclosed in a vessel and pressurized with vent loop pressure. This eliminates the pressure differential from inside rotatable bed assembly 20 to outside that is forcing the seal apart (sealing faces separating), which otherwise would have to be counteracted by squeezing the seals together harder, which increases friction.

In embodiments sealing interfaces 121, 122, 124a, 124b are rotated by motor 70, via gear 71, and controlled by controller 90 to form a combination of fluid-diverting valve and sorbent-containing sealed bed 120 together, minimizing plumbing and ullage volume in the system. This combination of valve functions and rotatable bed assembly 20,120 inherently achieve fluid-diverting function, obviating a need for additional valves or their control system.

In addition, the temperature of the sorbent material 100 is inherently prevented from performance decreasing temperature variations by rotatable bed assembly 20,120 alternately exposed to fluid, e.g. from first fluid source 80, and fluid from second fluid source, e.g. regeneration source 81, within a short period.

Output fluid flowing through output port 14 may achieve unvarying concentration of constituents by continuous regeneration. In addition, fluid immediately surrounding sorbent material 100 typically serves as a sweep fluid when desorbed to lower pressure environment with said sweep fluid preventing back-contamination from the environment.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:
1. A continuously regenerable scrubber, comprising:
 a. an upper header, the upper header comprising:
  i. an outer surface;
  ii. an inner surface;
  iii. an upper header fluid inlet disposed through the outer surface to the inner surface, the upper header fluid inlet defining a fluid pathway into the inner surface;
  iv. an upper header pressure inlet disposed through the outer surface to the inner surface; and
  v. an upper header gasket;
 b. an upper header spacer disposed about the lower surface of the upper header;
 c. a lower header connected to the upper header, the lower header comprising:
  i. an outer surface;
  ii. an inner surface;
  iii. a partitioning wall disposed within the inner surface, the partitioning wall defining a desorption area and a separate absorption area;
  iv. a lower header fluid outlet disposed through the outer surface to the inner surface;
  v. a lower header pressure outlet disposed through the outer surface to the inner surface; and
  vi. a lower header gasket;
 d. a lower header spacer disposed about the inner surface of the lower header;
 e. a rotatable bed assembly disposed intermediate the upper header and the lower header, the rotatable bed assembly comprising:
  i. a bed comprising a shape that is rotatable within the upper header and the lower header, the bed comprising a material receiver therethrough, the material receiver comprising a predetermined sorbent material disposed within the material receiver, the sorbent material operative via absorption alone, adsorption alone, and absorption and adsorption together, and of desorption of substances from or to flowing media;
  ii. a bottom gasket disposed proximate a lower surface of the bed;
  iii. a bottom bed screen disposed intermediate the bottom gasket and the lower surface of the bed;
  iv. a bottom disk connected to the bottom bed screen;
  v. a lower space disposed intermediate the bottom disk and the lower header;
  vi. an upper gasket disposed proximate an upper surface of the bed;
  vii. an upper bed screen disposed intermediate the upper gasket and the upper surface of the bed;
  viii. an upper disk connected to the upper bed surface;
  ix. a header spacer disposed intermediate the upper header and the upper gasket;
 f. a rotator operatively in communication with the rotatable bed assembly; and
 g. a fastener adapted to fasten the upper header to the lower header.

2. The continuously regenerable scrubber of claim 1, wherein:
 a. the upper header comprises an upper header interior wall defining a plurality of upper header fluid chambers; and
 b. the partitioning wall of the lower header further defines a plurality of lower header fluid chambers, each of the plurality of lower header fluid chambers comprising a desorption area or a separate adsorption area.

3. The continuously regenerable scrubber of claim 2, wherein:
 a. the plurality of upper header fluid chambers further comprises two upper header fluid chambers separated by a first fluid blocking portion; and
 b. the plurality of lower header fluid chambers further comprises two lower header fluid chambers separated by a second fluid blocking portion.

4. The continuously regenerable scrubber of claim 1, wherein the predetermined sorbent material comprises amine.

5. The continuously regenerable scrubber of claim 1, wherein the header spacer and the bottom disk each comprise a diamond coating.

6. The continuously regenerable scrubber of claim 1, wherein the fastener comprises a plurality of bolts.

7. The continuously regenerable scrubber of claim 1, wherein the upper header spacer and the lower header spacer comprise a ceramic.

8. The continuously regenerable scrubber of claim 1, wherein:
 a. the upper header gasket comprises a plurality of openings; and
 b. the upper header spacer comprises a corresponding plurality of openings.

9. The continuously regenerable scrubber of claim 1, wherein:
 a. the lower header gasket comprises a plurality of openings; and
 b. the lower header spacer comprises a corresponding plurality of openings.

10. The continuously regenerable scrubber of claim 1, wherein:
 a. the bed comprises a plurality of material receivers therethrough, each with a predetermined sorbent material disposed therein;
 b. a bottom gasket comprises a plurality of openings;
 c. the bottom bed screen comprises a shape sufficient to conform to the plurality of material receivers;
 d. the bottom disk comprises a plurality of openings;
 e. the upper gasket comprises a plurality of openings;
 f. the upper bed screen comprises a shape sufficient to conform to the plurality of material receivers;
 g. the upper disk comprises a plurality of openings; and
 h. the header spacer comprises a plurality of openings.

11. The system for a continuously regenerable scrubber of claim 1, further comprising:
 a. a skirt disposed about an outer surface of the rotatable bed assembly, the skirt comprising an exterior surface and a substantially arcuate interior defining a geometry congruent with an outer boundary of the rotatable bed assembly; and
 b. a seal adapted to isolate the rotatable bed assembly from the exterior surface of the skirt.

12. The continuously regenerable scrubber of claim 1, wherein:
 a. the upper header fluid inlet is in fluid communication with a breathing gas; and
 b. the lower header fluid outlet is in fluid communication with a vacuum gas.

13. A continuously regenerable scrubber, comprising:
 a. an upper header, the upper header comprising:
  i. an outer surface;
  ii. an inner surface;

iii. an upper header fluid inlet disposed through the outer surface to the inner surface, the upper header fluid inlet defining a fluid pathway into the inner surface;
iv. an upper header pressure inlet disposed through the outer surface to the inner surface; and
v. an upper header gasket;
b. an upper header spacer disposed about the lower surface of the upper header;
c. a lower header connected to the upper header, the lower header comprising:
i. an outer surface;
ii. an inner surface;
iii. a partitioning wall disposed within the inner surface, the partitioning wall defining a desorption area and a separate absorption area;
iv. a lower header fluid outlet disposed through the outer surface to the inner surface;
v. a lower header pressure outlet disposed through the outer surface to the inner surface; and
vi. a lower header gasket;
d. a lower header spacer disposed about the inner surface of the lower header;
e. a rotatable bed assembly disposed intermediate the upper header and the lower header, the rotatable bed assembly comprising:
i. a bed comprising a shape that is rotatable within the upper header and the lower header, the bed comprising a material receiver therethrough, the material receiver comprising a predetermined sorbent material disposed within the material receiver;
ii. a bottom gasket disposed proximate a lower surface of the bed;
iii. a bottom bed screen disposed intermediate the bottom gasket and the lower surface of the bed;
iv. a bottom disk connected to the bottom bed screen;
v. a lower space disposed intermediate the bottom disk and the lower header;
vi. an upper gasket disposed proximate an upper surface of the bed;
vii. an upper bed screen disposed intermediate the upper gasket and the upper surface of the bed;
viii. an upper disk connected to the upper bed surface;
ix. a header spacer disposed intermediate the upper header and the upper gasket;
f. a rotator operatively in communication with the rotatable bed assembly;
g. a fastener adapted to fasten the upper header to the lower header;
h. a skirt disposed about an outer surface of the rotatable bed assembly, the skirt comprising an exterior surface and a substantially arcuate interior defining a geometry congruent with an outer boundary of the rotatable bed assembly; and
i. a seal adapted to isolate the rotatable bed assembly from the exterior surface of the skirt.

* * * * *